United States Patent [19]

Plummer

[11] Patent Number: 4,971,869
[45] Date of Patent: Nov. 20, 1990

[54] COLOR ENCODING PHOTOGRAPHIC FILM
[75] Inventor: William T. Plummer, Concord, Mass.
[73] Assignee: Polaroid Corporation, Cambridge, Mass.
[21] Appl. No.: 367,965
[22] Filed: Jun. 19, 1989
[51] Int. Cl.$^5$ .............................................. G03C 1/04
[52] U.S. Cl. ........................................ 430/7; 430/363; 430/369; 430/511
[58] Field of Search ................... 430/7, 363, 369, 511, 430/8

[56] References Cited
U.S. PATENT DOCUMENTS

| | | | |
|---|---|---|---|
| 4,307,165 | 12/1981 | Blazey et al. | 430/363 |
| 4,362,806 | 12/1982 | Whitmore | 430/7 |
| 4,580,159 | 4/1986 | Manabe | 358/44 |
| 4,610,536 | 8/1986 | Smyth et al. | 355/38 |
| 4,652,911 | 3/1987 | Teranishi et al. | 358/44 |
| 4,714,955 | 12/1987 | Nishimura et al. | 358/48 |
| 4,716,456 | 12/1987 | Hosaka et al. | 358/75 |
| 4,757,351 | 7/1988 | Birgmeir | 355/38 |
| 4,764,670 | 8/1988 | Pace et al. | 430/7 |

FOREIGN PATENT DOCUMENTS 11016  2/1978  Japan .
39824  10/1980  Japan .
0211718  9/1983  Japan .
60-55781  4/1985  Japan .

Primary Examiner—Hoa Van Le
Attorney, Agent, or Firm—Francis J. Caufield

[57] ABSTRACT

Color film which has relatively high photographic sensitivity, improved spatial sensitivity and reduced problems with aliasing between film stripe structure and scene content and from which full color photographic information can be extracted. An embodiment of the color film includes a black and white photographic film emulsion which is coated upon a substrate, which emulsion is covered with a repetitive pattern of a triad of: (a) color stripes such as yellow, green and cyan stripes wherein at least one of the colors is a nonprimary color; (b) color stripes of unsaturated hues such as, for example, pastel yellow, pastel green and pastel cyan stripes wherein at least one of the colors is a nonprimary unsaturated hue; or (c) color stripes of unsaturated hues of any color. Full color prints or enlargements are made by a hybrid process which includes electronic scanning to extract color information and an optical or an electronic method to extract detail information.

12 Claims, 3 Drawing Sheets

COLOR ENCODING PHOTOGRAPHIC FILM

BACKGROUND OF THE INVENTION

1. Field of the Invention

The present invention pertains to a color film and to methods for printing and enlarging images recorded therein.

2. Description of the Prior Art

Existing film technology for producing color images using black and white photographic material entails utilizing a high speed, high resolution panchromatic emulsion coated upon a transparent substrate, which emulsion is covered with a repetitive pattern of a triad of saturated red, green, and blue stripes. Such a film suffers from a host of problems. For example, the resolution of the film is limited by the resolution of the red, green, and blue stripes. Further, such a film is generally slow and, still further, such a film suffers from aliasing problems which are caused by the striped triads.

As a result, there is a need in the art for a full color film which has a higher photographic sensitivity, improved spatial resolution and reduced problems with aliasing between film stripe structure and scene content than those which occur in the above-described existing film.

SUMMARY OF THE INVENTION

Embodiments of the present invention satisfy the above-described need by providing a color film which has relatively high photographic sensitivity, improved spatial sensitivity, reduced problems with aliasing between film stripe structure and scene content, and which provides full color photographic information. In particular, an embodiment of the inventive film comprises a black and white photographic film emulsion which is coated upon a substrate, which emulsion is covered with a repetitive pattern comprised of a triad of: (a) color stripes such as yellow, green and cyan stripes wherein at least one of the colors is a nonprimary color; (b) color stripes of unsaturated hues such as, for example, pastel yellow, pastel green and pastel cyan stripes wherein at least one of the colors is a nonprimary unsaturated hue; or (c) color stripes of unsaturated hues of any color. Specifically, a preferred embodiment of the inventive color film comprises a high speed, high resolution panchromatic black and white emulsion which is coated on a substrate, which emulsion is covered with triads of pastel yellow, pastel green, and pastel cyan lower resolution stripes.

The inventive color film is advantageous in that high quality image detail is contained in the black and white portion of the film and color detail is adequately encoded in the lower resolution color stripes. Further, the advantageous properties of the film, such as, for example, increased speed, are obtained as a result of using unsaturated hues which sacrifices projection color fidelity while retaining the ability to provide full color prints and enlargements.

Full color prints and enlargements of images recorded in the inventive color film are made in accordance with the present invention by means of a hybrid process which comprises (a) a method for extracting color information and (b) a method for extracting detail information. Specifically, the method for extracting color information comprises an electronic scanning method and the method for extracting detail information comprises an optical method or a further electronic scanning method. Further, the electronic scanning method for extracting color information falls into two classes: (a) the first class of electronic scanning will be referred to as synchronous electronic scanning and it comprises a method wherein each stripe being measured is unambiguously identified as to color and (b) the second class of electronic scanning will be referred to as asynchronous electronic scanning and it comprises a method wherein individual stripes are not resolved, i.e., the electronic scanner is oblivious to their geometric arrangement, and color information is obtained as it appears averaged over a larger area, for example, an area covering an integral number of triads. Moreover, in both classes of electronic scanning, three colored lasers or three color filters are used to sort out the color information.

The method for extracting detail from the high resolution content of the recorded image contained in the black and white portion of the recorded image comprises (a) re-imaging the recorded image optically through a suitable copy lens onto a sensitive conventional or instant color photographic material or (b) electronically reading the recorded image with a high resolution scanner. At the same time, the color information which is recovered in accordance with the above-described method for extracting color information is re-introduced by, for example, control of low-resolution illuminations which span one or more triads.

The inventive color film is advantageous over the above-described existing color film which is comprised of triads of saturated stripes of red, green and blue for the additional reason that green photographic information is present in every stripe area of the inventive color film and not just in every third member of each triad as is the case for the existing color film. This is advantageous because it exploits the fact that the human eye derives most of its detail information from the green signal and the lower bandwidth chroma information from the red and blue signals. Further, if unsaturated dyes are used in an embodiment comprised of yellow, green and cyan stripe triads, then, to some extent, there will be red and blue detail present in every stripe location also.

As one can appreciate from the above, the use of unsaturated dyes in an embodiment comprised of, for example, yellow, green and cyan stripe triads, provides a further advantage because the black and white photographic emulsion is thereby exposed to more light than the black and white photographic emulsion in the existing color film which is covered with saturated red, green and blue stripe triads. As a result, the inventive color film will be faster than the existing color film because of the resulting greater exposure of the emulsion to light.

Note that in practice a compromise must be made between the use of vanishingly pale dyes which produce a substantially colorless photograph of maximal sensitivity and resolution and the use of such strongly absorbing dyes that too much information is lost. Weaker dye concentrations will yield photographic color identifications with increasing difficulty and, when weakened to excess, will result in inaccurate color choice or color "noise" which will appear as a fine mottle in prints. As a result, a compromise must be made to balance these two factors.

Finally, it is important to note that embodiments of the inventive color film are not restricted to a repetitive pattern of triads of stripes and, in fact, embodiments of the present invention also comprise quartets of stripes. Further, additional embodiments of the inventive color film comprise overlapping diagonal stripes or repetitive patterns of square or rectangular units which are comprised of, for example, four cells, where the upper left-hand cell is yellow, the upper right-hand cell and the lower left-hand cell are green, and the lower right-hand cell is cyan. Still further additional embodiments of the inventive color film comprise the repetitive pattern of units wherein the green is replaced with white.

DESCRIPTION OF THE DRAWINGS

The novel features that are considered characteristic of the present invention are set forth with particularity herein, both as to their organization and method of operation, together with other objects and advantages thereof, and will be best understood from the following description of the illustrated embodiments when read in connection with the accompanying drawings wherein.

DESCRIPTION OF THE PREFERRED EMBODIMENT

Figure 1:
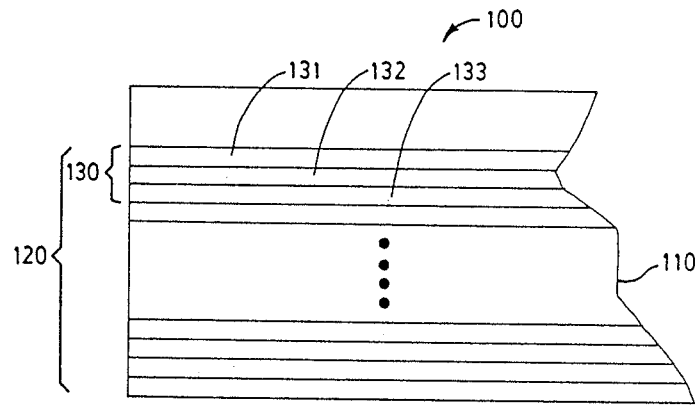
FIG. 1 shows, in pictorial form, an embodiment of the inventive color film.

Referring now to FIG. 1, there is shown at 100 an embodiment of the inventive color film. Specifically, color film 100 comprises black and white emulsion 110 which is coated upon a substrate (not shown) and, which emulsion 110 is covered with stripes 120. Stripes 120 are comprised of repetitive patterns 130 of triads comprised of pastel yellow stripe 131, pastel green stripe 132, and pastel cyan stripe 133. It is well known to those of ordinary skill in the art as to how black and white emulsion 110 is fabricated from a high speed, high resolution emulsion and as to how pastel yellow, green, and cyan stripes like stripes 131, 132, and 133 are fabricated from dye materials. For example, a typical embodiment of color film 100 will have approximately 1000 triads/inch wherein a typical stripe may be, for example, 2 microns thick. Further, it is also well known to those of ordinary skill in the art as to how the inventive color film is developed after it has been exposed to record an image.

Figure 2:
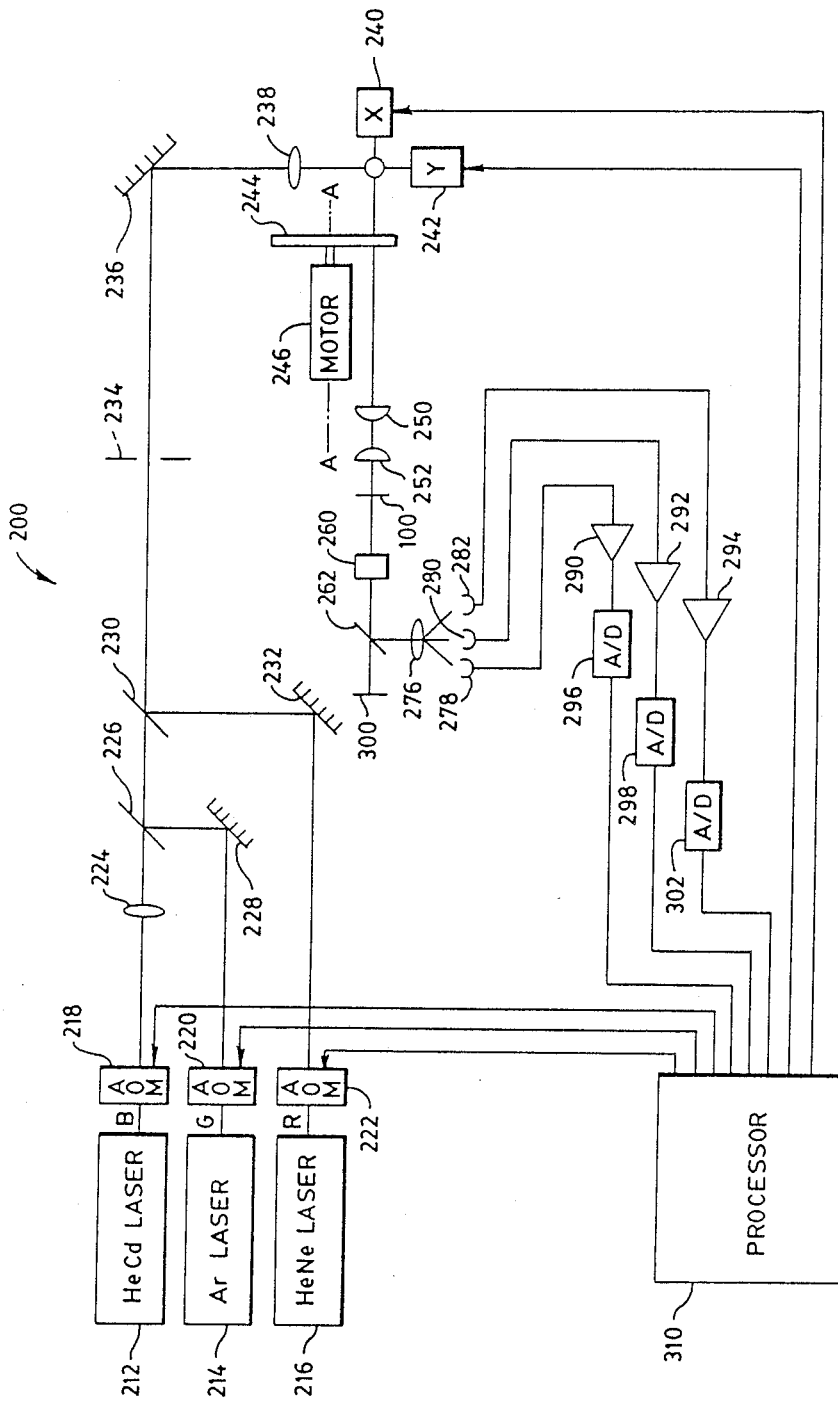
FIG. 2 shows, in pictorial form, an embodiment of an apparatus for printing images recorded on the inventive color film.

Referring now to FIG. 2, there is shown at 200 an embodiment of an apparatus for printing and/or enlarging an image recorded on color film 100 in accordance with an asynchronous electronic scanning method. Before describing the operation of apparatus 200 in detail we will first describe the operation of apparatus 200 in general.

In general, three, super-imposed, bore-sighted laser beams are scanned across color film 100. The super-imposed beams cover an area on color film 100 which is comprised of at least one triad of color stripes. The relative contributions of, for example, red, green and blue light in the original color exposure which produced the color image in the illuminated area on color film 100 is determined by comparing measurements of red, green and blue light transmitted through the illuminated area. Then, these relative contributions of red, green, and blue in the original exposure are used in a manner which is well known to those of ordinary skill in the art to calculate appropriate, relative, modulated amounts of red, green, and blue light which will be transmitted by the illuminated area on color film 100 to produce the determined color exposure on copy film 300. Next, modulators which are disposed to alter the amount of laser radiation which is applied from each laser source are adjusted to provide that the appropriate modulated amounts of red, green, and blue light will impinge upon color film 100. Note that this method may be performed in real time because the transmittance of color film 100 for each of the red, green and blue beams can be measured adequately at substantially any set of modulator levels. Further, although it is not a requirement of this embodiment of the inventive method for printing and/or enlarging images recorded in the inventive color film, the control loop for modulating the relative amounts of red, green, and blue laser radiation may provide a more accurate determination of the determined original exposure by measuring a sample of each laser output after it has passed through its respective modulator and before it impinges upon color film 100.

It should be clear to those of ordinary skill in the art that, in another embodiment of the inventive method, inventive color film 100 is scanned sequentially with red, green, and blue laser radiation and the transmittance measurements data are stored before copy film 300 is exposed. Then, the above-described determinations are made and color film 100 is exposed to the calculated, appropriate, relative, modulated amounts of red, green and blue laser radiation for printing and/or enlarging the image in copy film 300. Furthermore, this general discussion is applicable for a negative transparency photographic material or a reversal (positive) material. To gain the best resolution of fine details, in the method to follow, the original transparency and the final print are both negative or both reversal in property but, in principal, a correct print can be made this way even if the system uses one of each type.

Referring to FIG. 2, there is shown generally at 200 the apparatus for printing and enlarging images recorded in inventive color film 100. Apparatus 200 is comprised of three coherent laser light sources 212, 214, and 216. Laser light source 212 comprises a helium-cadmium laser for providing a blue beam of light, laser light source 214 comprises an argon laser for providing a green beam of light, and laser light source 216 comprises a helium-neon laser for providing a red beam of light. The output light beams from laser light sources 212, 214 and 216 are modulated respectively by acousto-optic modulators 218, 220 and 222. The blue laser light emanating from modulator 218 is directed by way of non-achromatic positive lens 224 to dichroic mirror 226 wherein it is combined with green laser light reflected to dichroic mirror 226 by reflecting surface 228. The composite blue-green laser light beam is thereafter directed to dichroic mirror 230 wherein it is combined with the red laser light beam reflected to dichroic mirror 230 by another reflecting surface 232.

The composite blue-green-red laser light beam is thereafter directed through an aperture 234 which blocks unwanted diffracted orders. The composite light beam is thereafter reflected from another reflecting surface 236 for transmission through another non-achromatic positive lens 238 to a pair of XY galvanometer mirrors as shown generally at 240 and 242. The composite colored laser light beam is reflected by XY galvanometer mirrors 240 and 242 through ground or frosted glass 244 which is rotatably driven about axis AA by motor 246. Ground glass 244 operates to change the composite colored laser light beam from coherent light to incoherent light. The change in the composite colored laser light from coherent to incoherent light by ground glass 244 operates to eliminate any speckle effect which is normally associated with coherent laser light.

The spot of light projected onto ground glass 244 is thereafter focused by field lenses 250 and 252 onto inventive color film 100. The light transmitted by color film 100 is focused onto copy lens 260 and copy lens 260 focuses the transmitted light, in turn, through beamsplitter mirror 262 onto full-color copy film 300. Some of the radiation which impinges upon beamsplitter 262 is reflected towards positive lens 276 which focuses the light onto red, green, and blue color photosensors 278, 280, and 282, respectively.

Each of photosensors 278, 280, and 282 provides an analog electronic information signal corresponding to the intensity of the particular color light transmitted thereto. The electronic information output signals from photosensors 278, 280, and 282, in turn, are amplified respectively by amplifiers 290, 292, and 294 and thereafter converted respectively from analog format signals to digital format signals by analog-to-digital converters 296, 298, and 302. The digital electronic information signals from converters 296, 298, and 302 are directed to processor 310. Processor 310 operates on the signals to determine an appropriate modulation for modulators 218, 220 and 222 in accordance with the inventive method as set forth in detail below.

Lastly, apparatus 200 scans inventive color film 100 by means of galvanometer mirrors 240 and 242 which are controlled in a well known manner by processor 310.

It should be clear to those of ordinary skill in the art that if copy lens 260 is an enlarging lens, one can make color enlargements of the image recorded in inventive color film 100. Further, instead of using a beamsplitter 262, other embodiments of the present invention could use a mirror which is: (a) placed in the position shown in FIG. 2 for beamsplitter 262 in order to determine appropriate settings for modulators 218, 220, and 222 and then (b) flipped out of the beam so that full-color film 300 may be exposed to make the print or enlargement. In such an embodiment, processor 310 will store the required measurement data in accordance with methods well known to those of ordinary skill in the art.

Figure 3:
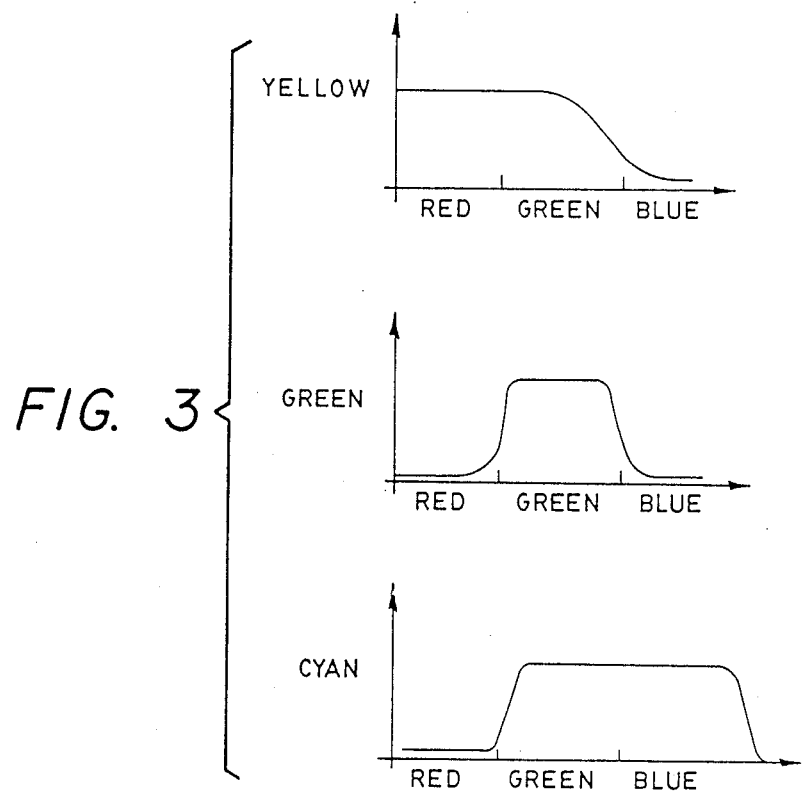
FIG. 3 shows, in graphical form, the relative spectral response of yellow, green, and cyan stripes used in one embodiment of the inventive color film.
Figure 4:
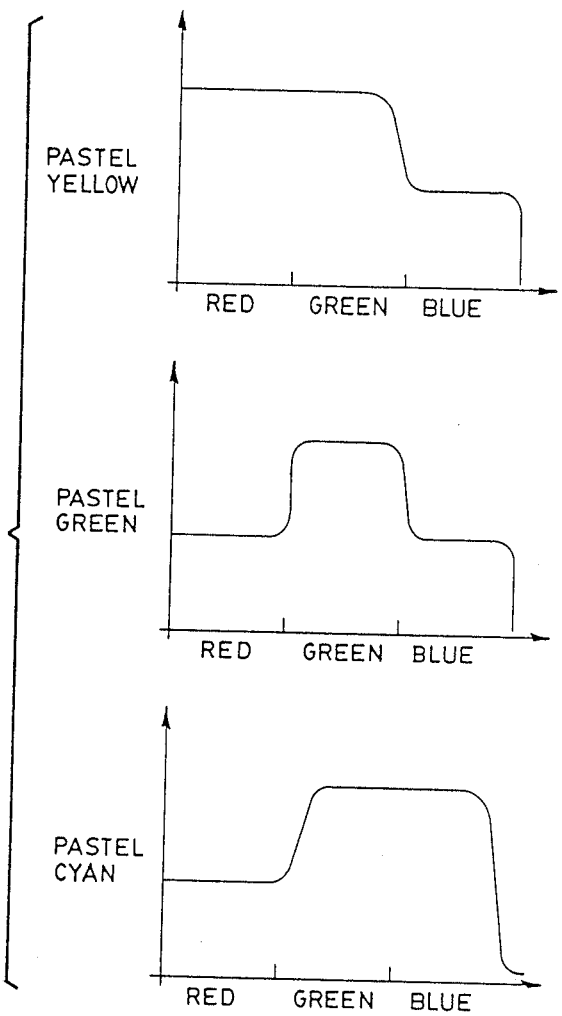
FIG. 4 shows, in graphical form, the relative spectral response of unsaturated yellow, green, and cyan stripes used in a preferred embodiment of the inventive color film where the adjective "pastel" is used to distinguish these less saturated colors.

In conjunction with FIGS. 3 and 4, we will describe the manner in which an asynchronous embodiment of the inventive method determines the original color exposure which produced the color image recorded in inventive color film 100 and how this information is used to provide appropriate modulations of radiation from lasers 212, 214, and 216, respectively, for printing and/or enlarging the image recorded in color film 100. In this embodiment, a reversal (positive) panchromatic emulsion is assumed.

FIG. 3 shows, in graphical form, the spectral response of yellow, green, and cyan stripes used with the emulsion in one embodiment of inventive color film 100. As shown in FIG. 3, the yellow stripe transmits green and red light and the cyan stripe transmits blue and green light. Further, as shown in FIG. 3, the color transmission characteristics of these stripes fall off sharply. For this embodiment, TABLE I shows the relative amounts of red, green, and blue light that will be detected by photosensors 278, 280, and 282, respectively, when a triad comprised of adjacent yellow, green and cyan stripes was exposed to original light of a particular color and then photographically developed. In Table I, input composition refers to light before the original exposure of color film 100 and output composition refers to light which has been transmitted by developed color film 100 as it is disposed in apparatus 200 shown in FIG. 2.

TABLE I

| ASYNCHRONOUS CASE | |
|---|---|
| Color of Incident Light (Input Composition) | Relative Amounts of Light Transmitted by the Film, Averaged Over Full Triads (Output Composition) |
| White (Red=1 Green=1 Blue=1) | Red=2 Green=5 Blue=2 |
| Red (Red=1 Green=0 Blue=0) | Red=1 Green=1 Blue=0 |
| Green (Red=0 Green=1 Blue=0) | Red=1 Green=3 Blue=1 |
| Blue (Red=0 Green=0 Blue=1) | Red=0 Green=1 Blue=1 |
| Yellow (Red=1 Green=1 Blue=0) | Red=2 Green=4 Blue=1 |
| Magenta (Red=1 Green=0 Blue=1) | Red=1 Green=2 Blue=1 |
| Cyan (Red=0 Green=1 Blue=1) | Red=1 Green=4 Blue=2 |
| Black (Red=0 Green=0 Blue=0) | Red=0 Green=0 Blue=0 |

Table I is developed as follows. As to white light (comprising equal amounts of red, green, and blue), if white light impinges upon a yellow, a green, and a cyan stripe, then the relative amounts of exposure of the yellow, green, and blue stripes are (2,1,2). This is because: (a) red light will expose only the yellow stripe; (b) green light will expose the yellow stripe, the green stripe and the cyan stripe; and (c) blue light will expose only the cyan stripe. Adding these gives relative exposures of yellow=2, green=1, and cyan=2. After development, if white light impinges upon the resulting positive transparency, i.e., developed color film 100, then the relative amounts of colors that will be transmitted will be red=2, green=5, and blue=2. This is because, for white light impinging upon an area of inventive film 100 which has relative exposures of yellow=2, green=1, and cyan=2: (a) the relative amount of two for exposed yellow will transmit a relative amount of two for red and a relative amount of two for green; (b) the relative amount of one for exposed green will transmit a relative amount of one for green; and (c) the relative amount of two for cyan will transmit a relative amount of two for green and a relative amount of two for blue. Adding these amounts gives red=2, green=5, and blue=2 for the relative amounts of transmitted radiation.

As one can readily appreciate, a similar methodology may be used to derive the remaining entries in TABLE I. Next, the values of relative intensities detected for given input colors are used to derive equations which are used to determine the original colors that exposed color film 100 to produce the recorded image, i.e., we want to transform the transmitted relative intensities into the relative intensities of the colors which originally impinged upon color film 100. Thus, we need a decoding matrix to transform from the output on the right in TABLE I to the input on the left in TABLE I.

For this embodiment, the red, green, and blue input quantities may be obtained from the transmission measurements of red, green, and blue through the following equations:

$$\begin{aligned} red_{in} &= 2*red_{out} - green_{out} + blue_{out} \\ green_{in} &= green_{out} - red_{out} - blue_{out} \\ blue_{in} &= red_{out} - green_{out} + 2*blue_{out} \end{aligned} \quad (1)$$

As in any color matrix calculation, the same equations will be valid over a wide gamut of colors, not just these eight "pure" colors.

FIG. 4 shows, in graphical form, the spectral response of unsaturated yellow, green, and cyan stripes used in a preferred embodiment of the inventive color film. The yellow stripe is arranged to pass fully the red and green light with a 50% transmission in the blue region; the green stripe is arranged to pass fully the green light with a 50%. transmission in the red and blue regions; and the cyan stripe is arranged to pass all of the green and blue light with a 50% transmission in the red region. Thus, none of the individual stripes has a sharp cut-off characteristic as shown in FIG. 3 and each stripe passes some red, green and blue light to maintain high sensitivity and resolution while incurring some reduction in the signal-to-noise ratio in the color signal. If unsaturated dyes are used for the yellow, green and cyan, the calculations carried out above for eqn. (1) are carried out in a similar manner; however, the coefficients of $red_{out}$, $green_{out}$, and $blue_{out}$ will be substantially larger than one. This embodiment represents a case where one is increasingly sensitive to noise and offset errors. Note that a compromise must be made between using vanishingly pale dyes which yield a colorless photograph of maximal sensitivity and resolution, but no color, and the use of such strongly absorbing dyes that too much information is lost. Weaker dye concentrations will yield photographic color identifications with increasing difficulty and, when weakened to excess, will result in inaccurate color choice or color "noise" which will appear as a fine mottle. Therefore, in practice, a compromise must be selected to balance these two matters.

For this embodiment, TABLE II shows the relative amounts of red, green, and blue light that will be detected by photosensors 278, 280, and 282, respectively, when a triad comprised of adjacent pastel yellow, pastel green and pastel cyan stripes was exposed to original light of a particular color.

TABLE II

| Color of Incident Light (Input Composition) | Relative Amounts of Transmitted Light (Output Composition) |
| --- | --- |
| White (Red=1 Green=1 Blue=1) | Red=19 Green=28 Blue=19 |
| Red (Red=1 Green=0 Blue=0) | Red=6 Green=8 Blue=5 |
| Green (Red=0 Green=1 Blue=0) | Red=8 Green=12 Blue=8 |
| Blue (Red=0 Green=0 Blue=1) | Red=5 Green=8 Blue=6 |
| Yellow (Red=1 Green=1 Blue=0) | Red=14 Green=20 Blue=13 |
| Magenta (Red=1 Green=0 Blue=1) | Red=11 Green=16 Blue=11 |
| Cyan (Red=0 Green=1 Blue=1) | Red=13 Green=20 Blue=14 |
| Black (Red=0 Green=0 Blue=0) | Red=0 Green=0 Blue=0 |

Table II is developed in the same manner as illustrated for Table I above. For example, as to white light, if white light impinges upon a 50% pastel yellow, a 50% pastel green, and a 50% pastel cyan stripe, then the relative amounts of exposure of the pastel yellow, pastel green, and pastel blue stripes are (5,4,5). This is because: (a) red light will be passed by the pastel yellow stripe in double intensity, but by the pastel green stripe and the pastel cyan stripe both in single intensity; (b) green light will be passed by the pastel yellow stripe in double intensity, the pastel green stripe in double intensity and the pastel cyan stripe in double intensity; and (c) blue light will be passed by the pastel yellow stripe in single intensity, the pastel green stripe in single intensity and the pastel cyan stripe in double intensity. Adding these gives pastel yellow=5, pastel green=4, and pastel blue=5. After reversal development, if white light impinges upon the transparency, then the relative amounts of colors that will be transmitted will be red=19, green=28, and blue=19. This is because, for white light impinging upon an area of inventive film 100 which has relative exposures of pastel yellow=5, pastel green=4, and pastel cyan=5: (a) the relative amount of five for exposed pastel yellow will transmit a relative amount of ten for red, a relative amount of ten for green, and a relative amount of five for blue; (b) the relative amount of four for exposed pastel green will transmit a relative amount of four for red, a relative amount of eight for green, and a relative amount of four for blue; and (c) the relative amount of five for pastel cyan will transmit a relative amount of five for red, a relative amount of ten for green, and a relative amount of ten for blue. Adding these amounts gives red=19, green=28, and blue=19 for the relative amounts of transmitted radiation.

For this preferred embodiment, the red, green, and blue input quantities may be obtained from the transmission measurements of red, green, and blue through the following equations:

$$\begin{aligned} red_{in} &= 8*red_{out} - 8*green_{out} + 4*blue_{out} \\ green_{in} &= 11*green_{out} - 8*red_{out} - 8*blue_{out} \\ blue_{in} &= 4*red_{out} - 8*green_{out} + 8*blue_{out} \end{aligned} \quad (2)$$

As one can readily appreciate, the $red_{out}$, $green_{out}$, and $blue_{out}$ measurements are transmission measurements which are inferred from the ratio of sensed light after the transparency to that striking it, taken one color at a time. The values of $red_{out}$, $green_{out}$, and $blue_{out}$ do not depend on the amount of each laser beam passed by the respective modulator as they are ratios, electrically averaged over a few triads to avoid the distorting influence of fine details. Therefore, eqns. (1) and (2) which provide $red_{in}$, $green_{in}$, and $blue_{in}$ can be evaluated in real-time and used to modulate lasers 212, 214, and 216, respectively, to the appropriate relative levels to provide appropriate proportions of red, green and blue. As a result, a normal photograph is printed on color film 300 wherein the colors are derived by electronic scanning means and the tone scale is obtained in the customary way by photographic means from the inventive film 100. This is further advantageous because the electronic scanning does not have to have the high resolution required for the details which are stored in the black and white portion of the film.

It should be clear to those of ordinary skill in the art as to how color film 100 can be fabricated to comprise stripes of unsaturated dyes such as yellow, green and cyan dyes and as to how such dyes can be fabricated to pass 50% or any other desired level of the suppressed colors. Further, it should be well known to those of ordinary skill in the art as to how such film may be developed to provide reversal positive transparencies.

Although we have described an embodiment of the inventive method for extracting color information which utilizes an asynchronous electronic scanning method, it should be clear to those of ordinary skill in the art as to how embodiments of the inventive method for determining color information operate in the simpler case when a synchronous electronic scanning method is used. For example, in such a method, apparatus 200 shown in FIG. 2, focuses the super-imposed laser beam to a resolution which is small enough to be able to resolve single stripes. Further, the specific color of a stripe may then be determined in a well known manner by logic contained within processor 310 which evaluates the output from photosensors 276, 280, and 282, respectively, or the specific color of a stripe may be determined by the counting after processor 310 recognizes a predetermined pattern which is placed on inventive color film 100 or after an analysis which is performed on the basis of information pertaining to a small number of stripes.

Other embodiments of the invention, including additions, subtractions, deletions and other modifications of the preferred disclosed embodiments of the invention will be obvious to those skilled in the art and are within the scope of the following claims. For example, it should be clear to those of ordinary skill in the art that embodiments of the present invention are not limited to the use of photographic means to derive the high resolution tone scale and this information may be extracted from the black and white image electronically in a manner which is well known to those of ordinary skill in the art. Then the electronic detailed tone scale and the electronically derived color information may be combined to provide complete electronic reproduction.

In addition, it is important to note that embodiments of the inventive color film are not restricted to a repetitive pattern of triads of stripes and, in fact, embodiments of the present invention also comprise quartets of stripes. Further, additional embodiments of the inventive color film comprise overlapping diagonal stripes or repetitive patterns of square or rectangular units which are comprised of, for example, four cells, where the upper left-hand cell is yellow, the upper right-hand cell and the lower left-hand cell are green, and the lower right-hand cell is cyan. Still further additional embodiments of the inventive color film comprise the repetitive pattern of units wherein the green is replaced with white.

What is claimed is:

1. A color film comprising:
   a substrate;
   a panchromatic emulsion coated upon said substrate; and
   a filter covering at least a portion of said emulsion, said filter comprising a repetitive pattern of a unit of adjacent colored cells where at least one of said cells is a subtractive primary.

2. The color film of claim 1 wherein said unit comprises color stripes.

3. The color film of claim 2 wherein said unit comprises yellow, green and cyan color stripes.

4. The color film of claim 1 wherein said unit comprises four cells of substantially equal area.

5. The color film of claim 4 wherein said unit comprises one yellow cell, two green cells and one cyan cell.

6. A color film comprising:
   a substrate;
   a panchromatic emulsion coated on said substrate; and
   a filter covering at least a portion of said emulsion, said filter being comprised of a repetitive pattern of a unit of adjacent colored cells where at least one of said cells is a pastel color.

7. The color film of claim 6 wherein said cell of said unit comprise color stripes.

8. The color film of claim 7 wherein said unit comprises pastel yellow, green and cyan color stripes.

9. The color film of claim 7 wherein said unit comprises pastel red, green and blue color stripes.

10. The color film of claim 6 wherein said unit comprises four cells of substantially equal area.

11. The color film of claim 7 wherein said unit comprises one pastel yellow cell, two pastel green cells and one unsaturated cyan cell.

12. The color film of claim 10 wherein said unit comprises one pastel yellow cell, two white cells and one pastel cyan cell.

* * * * *